US011052891B2

(12) United States Patent
Niepelt et al.

(10) Patent No.: US 11,052,891 B2
(45) Date of Patent: Jul. 6, 2021

(54) BRAKE SYSTEM AND METHOD FOR OPERATING A BRAKE SYSTEM

(71) Applicant: Continental Teves AG & Co. oHG, Frankfurt (DE)

(72) Inventors: Mathias Niepelt, Friedberg (DE); Iris Halbe, Butzbach (DE); Thorsten Wickenhöfer, Hofheim (DE); Ralf Richard Reviol, Dietzenbach-Steinberg (DE); Klaus Berger, Frankfurt (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 0 days.

(21) Appl. No.: 15/940,313

(22) Filed: Mar. 29, 2018

(65) Prior Publication Data

US 2018/0222464 A1    Aug. 9, 2018

Related U.S. Application Data (63) Continuation of application No. PCT/EP2016/072403, filed on Sep. 21, 2016.

(30) Foreign Application Priority Data

Oct. 1, 2015    (DE) .................... 10 2015 219 001.3

(51) Int. Cl.
*B60T 13/58*    (2006.01)
*B60T 8/88*    (2006.01)
(Continued)

(52) U.S. Cl.
CPC .............. *B60T 13/588* (2013.01); *B60T 8/17* (2013.01); *B60T 8/885* (2013.01); *B60T 13/66* (2013.01);
(Continued)

(58) Field of Classification Search
CPC .......... B60T 8/885; B60T 8/17; B60T 8/4081; B60T 13/66; B60T 13/588; B60T 2270/404; B60T 2270/82
(Continued)

(56) References Cited

U.S. PATENT DOCUMENTS

| 2002/0113488 A1 | 8/2002 | Harris |
| 2009/0039702 A1 | 2/2009 | Nishino et al. |

(Continued)

FOREIGN PATENT DOCUMENTS

| CN | 101362460 A | 2/2009 |
| CN | 104309597 A | 1/2015 |

(Continued)

OTHER PUBLICATIONS

International Search Report and Written Opinion dated Nov. 24, 2016 from corresponding International Patent Application No. PCT/EP2016/072403.

(Continued)

*Primary Examiner* — Robert A. Siconolfi
*Assistant Examiner* — San M Aung (57) ABSTRACT

An electrohydraulic brake system, comprising a brake master cylinder. A pressure generating device for actuating wheel brakes and an additional brake actuator may both be activated electronically. In a normal mode of operation, an open- and closed-loop control unit detects a braking demand based on the actuation of a brake pedal by the driver and activates the pressure generating device to build up braking torque at the wheel brakes. If the pressure generating device is not activated, the driver gains direct access to the wheel brakes and the control unit activates the additional brake actuator to build up braking torque. In the fallback mode, when a predetermined pedal travel threshold value is reached, the control loop activates the additional brake (Continued)

actuator to build up braking torque. In the event of a succession of brake pedal actuations by the driver, the pedal travel threshold value is increased at least once.

11 Claims, 3 Drawing Sheets

(51) Int. Cl.
　　　*B60T 8/17*　　　(2006.01)
　　　*B60T 13/66*　　(2006.01)
　　　*B60T 8/40*　　　(2006.01)
(52) U.S. Cl.
　　　CPC ....... *B60T 8/4081* (2013.01); *B60T 2270/404* (2013.01); *B60T 2270/82* (2013.01)
(58) Field of Classification Search
　　　USPC .......................................................... 303/14
　　　See application file for complete search history.

(56) References Cited

U.S. PATENT DOCUMENTS

| | | | | |
|---|---|---|---|---|
| 2009/0302673 | A1* | 12/2009 | Linhoff | B60T 8/1766 303/3 |
| 2010/0198475 | A1* | 8/2010 | Stolzl | B60W 10/184 701/74 |
| 2012/0169112 | A1 | 7/2012 | Jungbecker et al. | |
| 2013/0080017 | A1* | 3/2013 | Bohm | B60T 13/662 701/78 |
| 2014/0368027 | A1* | 12/2014 | Bohm | B60T 11/103 303/14 |
| 2015/0019101 | A1* | 1/2015 | Bajorat | B60T 7/22 701/71 |
| 2015/0175146 | A1 | 6/2015 | Quirant et al. | |
| 2015/0224972 | A1 | 8/2015 | Feigel | |

FOREIGN PATENT DOCUMENTS

| | | |
|---|---|---|
| DE | 60030271 T2 | 8/2007 |
| DE | 102012210434 A1 | 1/2013 |
| DE | 102012201820 A1 | 8/2013 |
| DE | 102013227065 A1 | 6/2015 |
| KR | 1020120079093 A | 7/2012 |
| KR | 1020150052270 A | 5/2015 |
| WO | 2015074935 A1 | 5/2015 |

OTHER PUBLICATIONS

German Search Report dated Jun. 13, 2016 for corresponding German Patent Application No. 10 2015 219 001.3.

* cited by examiner

BRAKE SYSTEM AND METHOD FOR OPERATING A BRAKE SYSTEM

CROSS-REFERENCE TO RELATED APPLICATIONS

This application claims the benefit of PCT Application PCT/EP2016/072403, filed Sep. 21, 2016, which claims priority to German Application DE 10 2015 219 001.3, filed Oct. 10, 2015. The disclosures of the above applications are incorporated herein by reference.

TECHNICAL FIELD

The invention relates to an electrohydraulic brake system.

BACKGROUND

In motor vehicles "brake-by-wire" brake installations are being used ever more widely. Brake installations of this kind often have not only a brake master cylinder that can be actuated by the vehicle driver but also an electrically activatable pressure generating device (activatable "by-wire"), by means of which actuation of the wheel brakes takes place in the "brake-by-wire" operating mode.

In these brake systems, especially electrohydraulic brake systems with the "brake-by-wire" operating mode, the driver does not have direct access to the brakes. When the pedal is actuated, a pedal decoupling unit and a simulator are usually actuated, and the braking demand of the driver is detected by a sensor system. The pedal simulator is used to give the driver a brake pedal feel which is as familiar and comfortable as possible. The detected braking demand leads to the determination of a setpoint braking torque, from which the setpoint brake pressure for the brakes is then determined. The brake pressure is then built up actively in the brakes by a pressure generating device.

In the "by-wire" operating mode, the actual braking is achieved by active pressure buildup in the brake circuits with the aid of a pressure generating device, which is activated by an open- and closed-loop control unit. By virtue of the hydraulic decoupling of the brake pedal actuation from the pressure buildup, a large number of functionalities, such as ABS, ESC, TCS, slope starting assistance etc., may be implemented in a convenient manner for the driver in brake systems of this kind.

In brake systems of this kind, a hydraulic fallback mode is usually provided, by means of which the driver may brake or halt the vehicle by muscle power by actuating the brake pedal if the "by-wire" operating mode fails or is disrupted. Whereas, in the normal mode, there is the above-described hydraulic decoupling between brake pedal actuation and brake pressure buildup, by means of a pedal decoupling unit for example, this decoupling is canceled in the fallback mode, thus enabling the driver to displace brake fluid directly into the brake circuits. A transition is made to the fallback mode when, for example, it is no longer possible to build up pressure with the aid of the pressure generating device. This is the case inter alia if the relevant sensor system for the activation of the pressure generating unit fails or if the brake pressure or the piston travel, for example, has no longer been reliably detected by the sensor system.

The pressure generating device in the brake systems described above is also referred to as an actuator or hydraulic actuator. In particular, actuators are designed as linear actuators or linear units, in which a piston is moved axially into a hydraulic pressure chamber to build up pressure.

Conventional brake systems predominantly comprise an actuating unit with a vacuum brake booster, a hydraulic tandem brake master cylinder and a downstream electronically controlled modulator unit for control functions connected with driving dynamics. A central electronic open- and closed-loop control unit (ECU) processes various sensor signals and commands, which may come from sensors installed in the vehicle or from other ECUs.

At a raised functionality level, the actuating unit may also initiate braking without the driver, e.g. in the case of an active booster. The brake booster may be of electrohydraulic or electromechanical design. Current brake systems essentially consist of separate modules for pressure generation and control functions. These may be accommodated in one or more housings in the vehicle.

DE 600 30 271 T2 discloses the practice of activating the parking brake to build up additional braking torque during a braking operation in the hydraulic fallback mode of a by-wire brake installation if the electric braking mode fails. However, the parking brake is not designed for such uses and can thus be overloaded and damaged.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A brake system is assisted in getting to the fallback mode but, at the same time, the parking brake is protected.

In respect of the brake system, in the fallback mode, the open- and closed-loop control unit monitors the brake pedal travel and, when a predetermined pedal travel threshold value is reached, activates the additional brake actuator to build up braking torque, and wherein, in the event of a succession of brake pedal actuations by the driver, the pedal travel threshold value is increased at least once.

The use of an additional brake actuator, for example, the parking brake, is expedient in a hydraulic fallback mode. In the fallback mode, the driver must build up the brake pressure by muscle power and accept longer brake pedal travels. Through the activation of the additional brake actuator, the parking brake, additional braking torque is built up for the motor vehicle, and therefore the driver does not get the false impression that it is no longer possible to brake the vehicle at all or that the brake system has failed completely because of the altered braking characteristic. In addition, the vehicle is also braked more powerfully by means of the additional braking torque component.

However, the additional brake actuator should be protected, especially if it is designed as a parking brake, since it is not designed for service braking operations and may be damaged if used too intensively and may completely or partially cease to operate.

As has now been recognized, it is possible to achieve assistance for the driver while also sparing the additional brake actuator if, in a sequence of brake pedal actuations, the activation of the additional brake actuator is shifted successively toward longer brake pedal travels. As a result, the driver initially finds out that it is still possible to brake the vehicle. Owing to the ever-increasing length of the brake pedal travels, the driver furthermore learns that it is necessary to cover ever longer brake pedal travels and therefore becomes accustomed to the new situation of the fallback mode.

The wheel brakes, which may be actuated by the brake master cylinder or the pressure generating device, which are probably part of the service brake. If the pressure generating device is not activated or cannot be activated, the driver gains direct access to the wheel brakes via the brake master cylinder in the hydraulic fallback mode.

In the event of a succession of brake pedal actuations, the pedal travel threshold value is shifted toward ever longer brake pedal travels. The driver must, therefore, depress the brake pedal ever further before the additional braking torque is applied by the additional brake actuator. From this, the driver learns that the additional braking effect occurs later and later and, at some point, will presumably not occur at all.

The sequence of increased brake pedal travels may have substantially equal pedal travel intervals. This regularity and hence foreseeability gives the driver reliability and certainty in learning the new braking behavior.

After a predetermined applicable maximum number of successive activations, the additional brake actuator may be no longer activated. In the meantime, the driver has learned that they are receiving assistance only transitionally and they have become accustomed to the long brake pedal travels and the powerful actuation of the brake pedal. The additional brake actuator is then spared and protected from overloading or damage. The number of successive activations may be between 30 and 50.

The intensity of the braking torque generated by the additional actuator is substantially equal. That is to say that, the braking torque built up by the additional brake actuator is substantially the same in each activation.

The additional brake actuator may be designed as a parking brake. In this case, the parking brake performs a dual function. Therefore, it may be activated when the vehicle is parked in order to hold or secure the vehicle, or it may serve as a braking aid in the fallback mode and indicates to the driver that the vehicle may still be braked, despite an altered braking characteristic.

In the normal mode of operation, the open- and closed-loop control unit detects a braking demand on the basis of the actuation of the brake pedal by the driver and activates the pressure generating device to build up braking torque at the wheel brakes of the service brake, wherein, if the pressure generating device is not activated or cannot be activated, the driver gains direct access to the wheel brakes and the open- and closed-loop control unit activates the additional brake actuator of the parking brake to build up braking torque in the hydraulic fallback mode.

If the parking brake is of electromechanical design. In this case, different designs of the electromechanical parking brake may be used, e.g. a brake cable assembly, duo-servo actuators, integrated brake caliper actuators, pure parking brake calipers. Here, the type of brake, e.g. disk or drum brake, or the principal of action, e.g. simplex, duo-servo or combination brake caliper, is not relevant.

Many other systems may be used as an electronically activatable additional brake actuator, provided they are suitable for assisting the braking demand of the driver, e.g. eddy current brakes, hydrodynamic brakes, retarders, the action of an electric motor.

The electronically activatable parking brake may be arranged on the rear axle and comprises at least one actuator. By way of example, this may be embodied with a single-cable brake cable assembly, which acts on both parking brake calipers in a manner similar to the handbrake lever.

In respect of the method, in the fallback mode, the brake pedal travel is monitored and, when a predetermined pedal travel threshold value is reached, the additional brake actuator is activated to build up braking torque, and wherein, in the event of a succession of brake pedal actuations by the driver, the pedal travel threshold value is increased at least once.

The alteration of the activation point of the additional actuator depending on the brake pedal travel on the one hand indicates to the driver that the vehicle may be still be braked in the fallback mode and, on the other hand, also indicates that the necessary brake pedal travels have changed and that longer brake pedal travels must be covered. Particularly if the activation of the additional brake actuator is shifted toward ever longer brake pedal travels in a sequence of brake pedal actuations, the driver learns that ever-increasing brake pedal travels are becoming necessary for a braking torque of the same magnitude. A uniform increase in the necessary brake pedal travel conveys to the driver a sense that the brake installation is predictable and functional, allowing said driver to adjust to the new situation in the fallback mode. If a parking brake is used as the additional actuator, there is furthermore no need to employ another actuator.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings.

DETAILED DESCRIPTION

In all of the figures, identical parts are denoted by the same reference designations.

Figure 1:
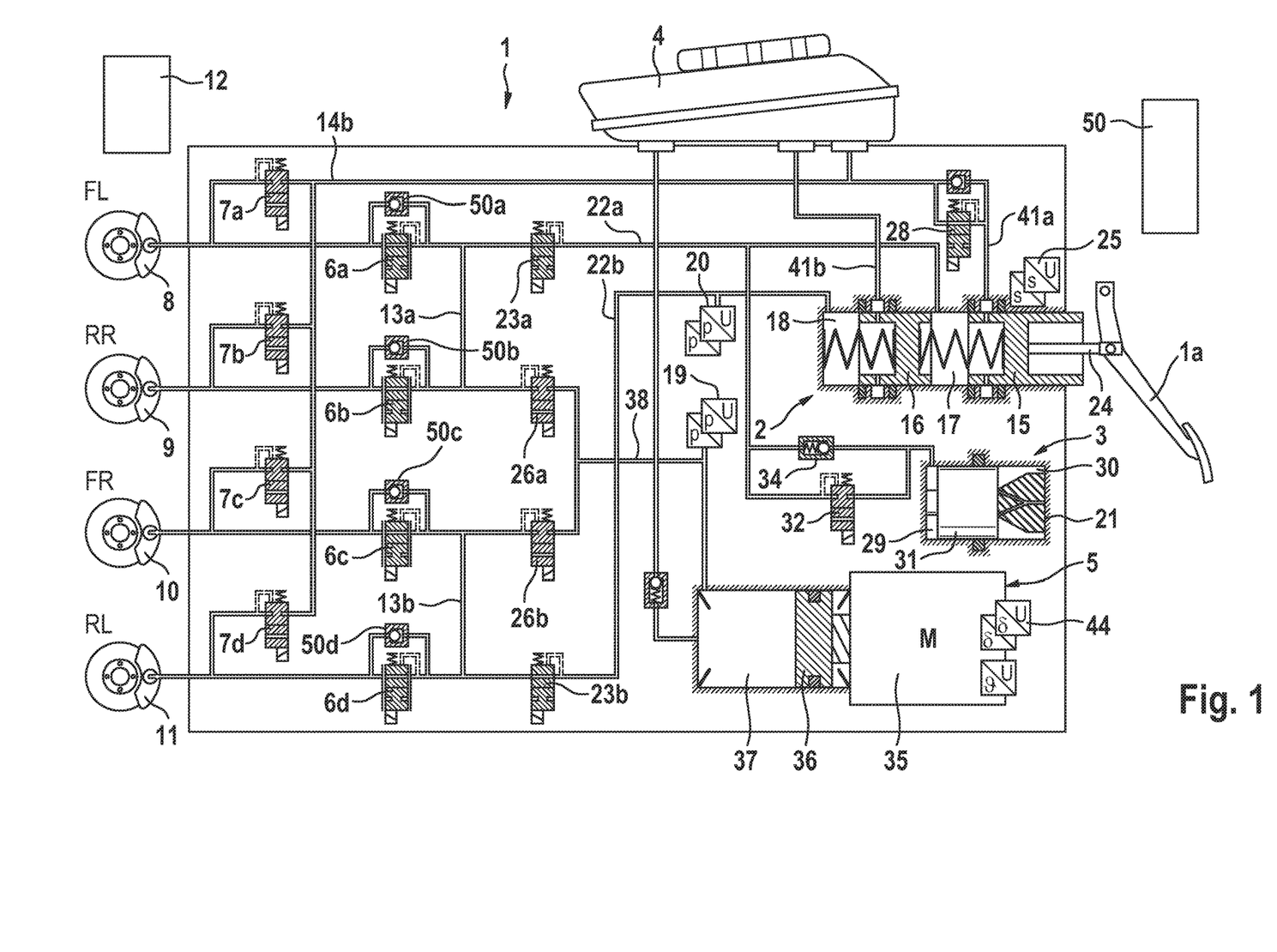
FIG. 1 shows a hydraulic circuit diagram of an electro-hydraulic brake system in a preferred embodiment.

FIG. 1 shows aN exemplary embodiment of an electro-hydraulic brake system 1 or brake installation. The brake system 1 comprises a brake master cylinder 2, which may be actuated by means of an actuating or brake pedal 1a, a simulation device 3 interacting with the brake master cylinder 2, a pressure medium reservoir 4 under atmospheric pressure associated with the brake master cylinder 2, an electrically controllable pressure generating device 5, which is formed by a cylinder-piston assembly having a hydraulic pressure chamber 37, the piston 36 of which may be moved by an electromechanical actuator comprising a motor 35 and a rotation/translation mechanism, an electrically controllable pressure modulation device for setting wheel-specific brake pressures and an electronic open- and closed-loop control unit 12.

By way of example, the pressure modulation device (not designated specifically) comprises, for each hydraulically actuable wheel brake 8, 9, 10, 11 of a motor vehicle (not shown), an inlet valve 6a-6d and an outlet valve 7a-7d, which are hydraulically interconnected in pairs by central ports and are connected to the wheel brakes 8, 9, 10, 11. The inlet ports of the inlet valves 6a-6d are supplied by means of brake circuit supply lines 13a, 13b with pressures which, in a "brake-by-wire" operating mode, are derived from a system pressure present in a system pressure line 38 connected to the pressure chamber 37 of the pressure generating device 5.

A check valve 50a-50d opening in the direction of the brake circuit supply lines 13a, 13b is connected in parallel with each of the inlet valves 6a-6d. In a fallback operating mode, the brake circuit supply lines 13a, 13b are supplied via hydraulic lines 22a, 22b with the pressures of pressure chambers 17, 18 of the brake master cylinder 2. The outlet ports of the outlet valves 7a-7d are connected to the pressure medium reservoir 4 by a return line 14b.

The brake master cylinder 2 has two pistons 15, 16 arranged in series, which delimit the hydraulic pressure chambers 17, 18. On the one hand, the pressure chambers 17, 18 are connected to the pressure medium reservoir 4 by radial holes formed in the pistons 15, 16 and corresponding pressure compensation lines 41a, 41b, wherein the connections may be shut off by a relative movement of the pistons 17, 18. On the other hand, the pressure chambers 17, 18 are connected to the abovementioned brake circuit supply lines 13a, 13b by means of the hydraulic lines 22a, 22b.

A normally open valve 28 is contained in pressure compensation line 41a. The pressure chambers 17, 18 contain return springs (not designated specifically), which position the pistons 15, 16 in an initial position when the brake master cylinder 2 is not actuated. A piston rod 24 couples the pivoting movement of the brake pedal 1a resulting from a pedal actuation with the translational movement of the first brake master cylinder piston 15, the actuation path of which is detected by a displacement sensor 25, which may be of redundant design. As a result, the corresponding piston displacement signal is a measure of the brake pedal actuation angle. It represents a braking demand of the vehicle driver.

Arranged in each of the line sections 22a, 22b connected to the pressure chambers 17, 18 is a respective block valve 23a, 23b, which is designed as an electrically actuable, preferably normally open, 2/2-way valve. By means of the block valves 23a, 23b, the hydraulic connection between the pressure chambers 17, 18 of the brake master cylinder and the brake circuit supply lines 13a, 13b may be shut off. A pressure sensor 20 of redundant design connected to line section 22b detects the pressure built up in pressure chamber 18 by a movement of the second piston 16.

The simulation device 3 may be coupled hydraulically to the brake master cylinder 2 and, by way of example, essentially comprises a simulator chamber 29, a simulator spring chamber 30 and a simulator piston 31 separating the two chambers 29, 30. The simulator piston 31 is supported on the housing 21 by an elastic element (e.g. a spring), which is arranged in the simulator spring chamber 30 and may be preloaded. The simulator chamber 29 may be connected to the first pressure chamber 17 of the brake master cylinder 2 by means of an electrically actuable simulator valve 32. When a pedal force is input and simulator valve 32 is open, pressure medium flows from brake master cylinder pressure chamber 17 into the simulator chamber 29. A check valve 34 arranged hydraulically antiparallel to the simulator valve 32 allows the pressure medium to flow back from the simulator chamber 29 to brake master cylinder pressure chamber 17 largely unhindered, irrespective of the switching state of the simulator valve 32. Other embodiments and connections of the simulation device to the brake master cylinder 2 are conceivable.

The electrically controllable pressure generating device 5 is designed as a hydraulic cylinder-piston assembly or a single-circuit electrohydraulic actuator, the pressure piston 36 of which, which delimits the pressure chamber 37, may be actuated by a schematically indicated electric motor 35 via a likewise schematically illustrated rotation/translational mechanism. A rotor position sensor, indicated only schematically, which serves to detect the rotor position of the electric motor 35, is denoted by reference sign 44. In addition, a temperature sensor for sensing the temperature of the motor winding may also be used.

The actuator pressure generated by the effect of the force of the piston 36 on the pressure medium enclosed in the pressure chamber 37 is fed into the system pressure line 38 and detected by means of a pressure sensor 19, which is preferably of redundant design. When the connecting valves 26a, 26b are open, the pressure medium enters the wheel brakes 8, 9, 10, 11 for the actuation thereof. Thus, when the connecting valves 26a, 26b are open, a wheel brake pressure buildup and reduction for all the wheel brakes 8, 9, 10, 11 takes place during a normal braking operation in the "brake-by-wire" operating mode by means of the forward and backward displacement of the piston 36.

During the pressure reduction, the pressure medium that has previously been displaced from the pressure chamber 37 into the wheel brakes 8, 9, 10, 11 flows back into the pressure chamber 37 over the same route. During a braking operation with wheel brake pressures that differ between individual wheels and are controlled with the aid of the inlet and outlet valves 6a-6d, 7a-7d (e.g. during an antilock control operation (ABS control)), in contrast, the pressure medium component discharged via the outlet valves 7a-7d flows into the pressure medium reservoir 4 and is thus initially no longer available to the pressure generating device 5 for the actuation of the wheel brakes 8, 9, 10, 11. Additional pressure medium may be drawn into the pressure chamber 37 by retraction of the piston 36 while the connecting valves 26a, 26b are closed.

By way of example, the brake installation 1 has a parking brake 50 of electromechanical design, which is an additional brake actuator. The parking brake 50 is designed as an electromechanical brake and is mounted on the rear axle of the vehicle. When the vehicle is parked, it is activated by the open- and closed-loop control unit 12 to build up braking torque to hold the vehicle.

In the normal "brake-by-wire" operating mode of the brake system 1, the open- and closed-loop control unit 12 detects the braking demand of the driver by means of the pedal travel sensor 25, which detects the brake pedal travel covered. From this, a setpoint braking torque or associated brake pressures to be set in the wheel brakes 8, 9, 10, 11 are determined. The open- and closed-loop control unit 12 activates the pressure generating device 5 to build up pressure.

In a hydraulic fallback mode, to which a switch or transition is made when the pressure generating device 5 may no longer build up sufficient brake pressure in the wheel brakes 8, 9, 10, 11, the pressure generating device 5 is separated hydraulically from the wheel brakes 8, 9, 10, 11 by closing the connecting valves 26a, 26b. To enable this to take place even when there is a failure of the onboard electrical system, the connecting valves 26a, 26b may be of normally closed design. The block valves 23a, 23b, which may be of normally open design, are open or are opened, enabling the driver to displace brake fluid into the wheel brakes 8, 9, 10, 11 by actuating the brake master cylinder 2 by muscle power.

During the transition from the normal "by-wire" operating mode to the hydraulic fallback mode, the braking properties of the brake system 1 change significantly. During this process, the brake pedal characteristic changes from "short and firm" to "long and soft". It is now only possible for braking torque to be built up directly by muscle power by the driver. When the brake pedal is actuated, brake fluid is displaced into at least one wheel brake 8, 9, 10, 11 by the movement of the pistons 15, 16 of the brake master cylinder. For this purpose, the driver must depress the brake pedal 1a more strongly than in the by-wire mode and also cover longer brake pedal travels to achieve the same braking torque as in the by-wire mode.

To ensure that, in the fallback mode, the driver does not mistakenly think that the brake system may no longer generate any braking force or that there is a total failure owing to the longer brake pedal travel and weaker braking force, the open- and closed-loop control unit 12 activates the parking brake 50 to build up braking torque in the example. The vehicle therefore brakes more sharply than it would if there were only the braking torque generated by the muscle power of the driver.

The brake system 1 is thus rendered capable of assisting the driver in this way in the fallback mode. At the same time, however, the parking brake is protected from overloading since it is not designed for continuous braking.

For this purpose, the open- and closed-loop control unit 12 varies the pedal travel threshold value at which the parking brake is activated in the event of successive brake pedal actuations. In the one embodiment, this variation takes place in such a way that the pedal travel threshold value selected is longer in successive brake pedal actuations. Thus, the braking torque of the parking brake 50 is built up with ever longer brake pedal travels. In this case, the maximum braking torque built up by the parking brake 50 is not varied. The respective braking torque applied by the parking brake 50 is between 0.25 and 0.4 g on a high friction coefficient, while the specific value depends on the instantaneous or dynamic axle load distribution and the characteristics of the roadway.

The way in which the parking brake 50 is activated according to the example and what effects the activation thereof has on the braking process of the vehicle are explained below with reference to diagrams shown in FIGS. 2, 3 and 4.

Figure 2:
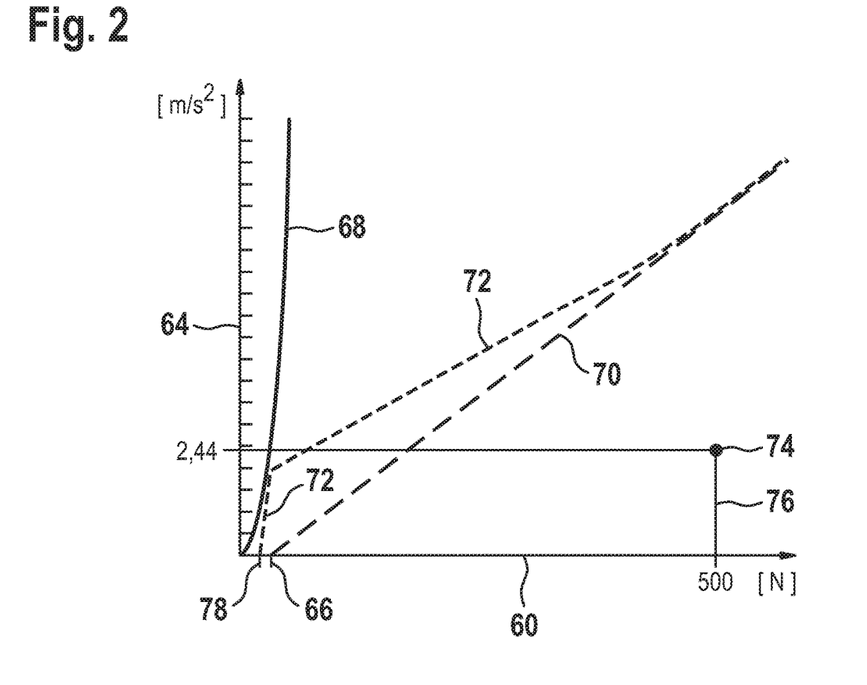
FIG. 2 shows a diagram, given by way of example, of the braking torque as a function of the pedal force expended in various braking scenarios.

According to the example, FIG. 2 shows a diagram in which the pedal force is indicated in newtons on an x axis 60 and the vehicle deceleration is indicated in m/s$^2$ on a y axis 64. Here, a first curve 68 shows the deceleration of the vehicle in the normal "by-wire" operating mode. A second curve 70 shows the vehicle deceleration in the normal hydraulic fallback mode, in which the driver builds up braking torque by muscle power (only). Curve 70 is accordingly significantly shallower than curve 68. It crosses the zero line after a pedal force threshold value 66 and then rises in a substantially linear manner.

A third curve 72 shows the vehicle deceleration in the hydraulic fallback mode, wherein the parking brake is additionally activated. Here, curve 72 rises steeply in a linear manner after a pedal force threshold value 78, after which it bends and continues to rise in a linear manner. It may be seen here that, when the parking brake is activated, the vehicle deceleration rises very quickly and then flattens off with a slope which is shallower than in the case of the normal fallback mode. The rapid rise encourages the driver to continue braking since the vehicle responds quickly and clearly to the driver's braking demand. Reference signs 74 and 76 describe the legal minimum requirement, according to which a minimum deceleration of the vehicle of 2.44 m/s$^2$ must be achieved with a pedal force of 500 N.

Figure 3:
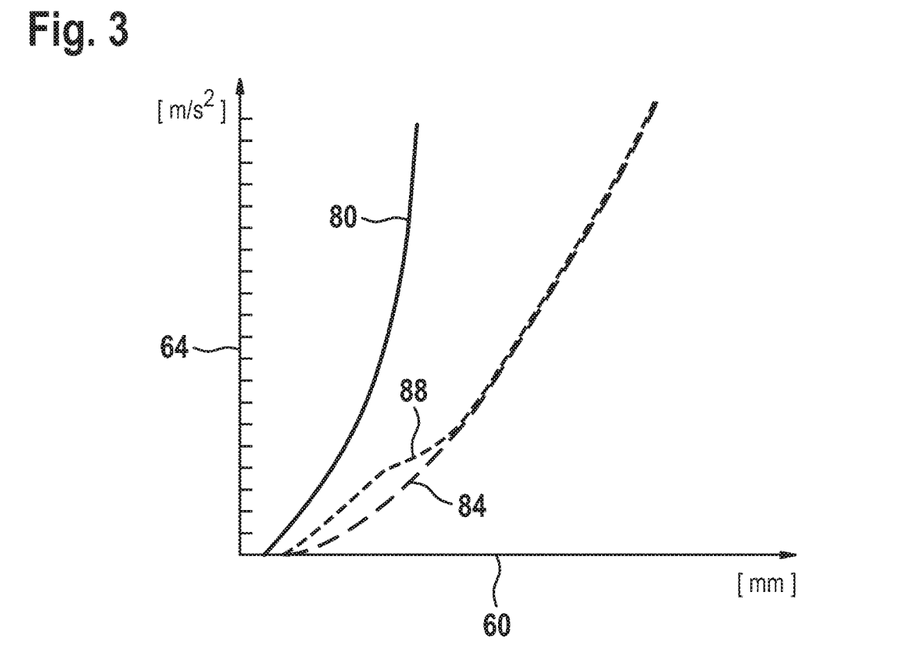
FIG. 3 shows a diagram, given by way of example, of the braking torque as a function of the brake pedal travel covered in various braking scenarios.
Figure 4:
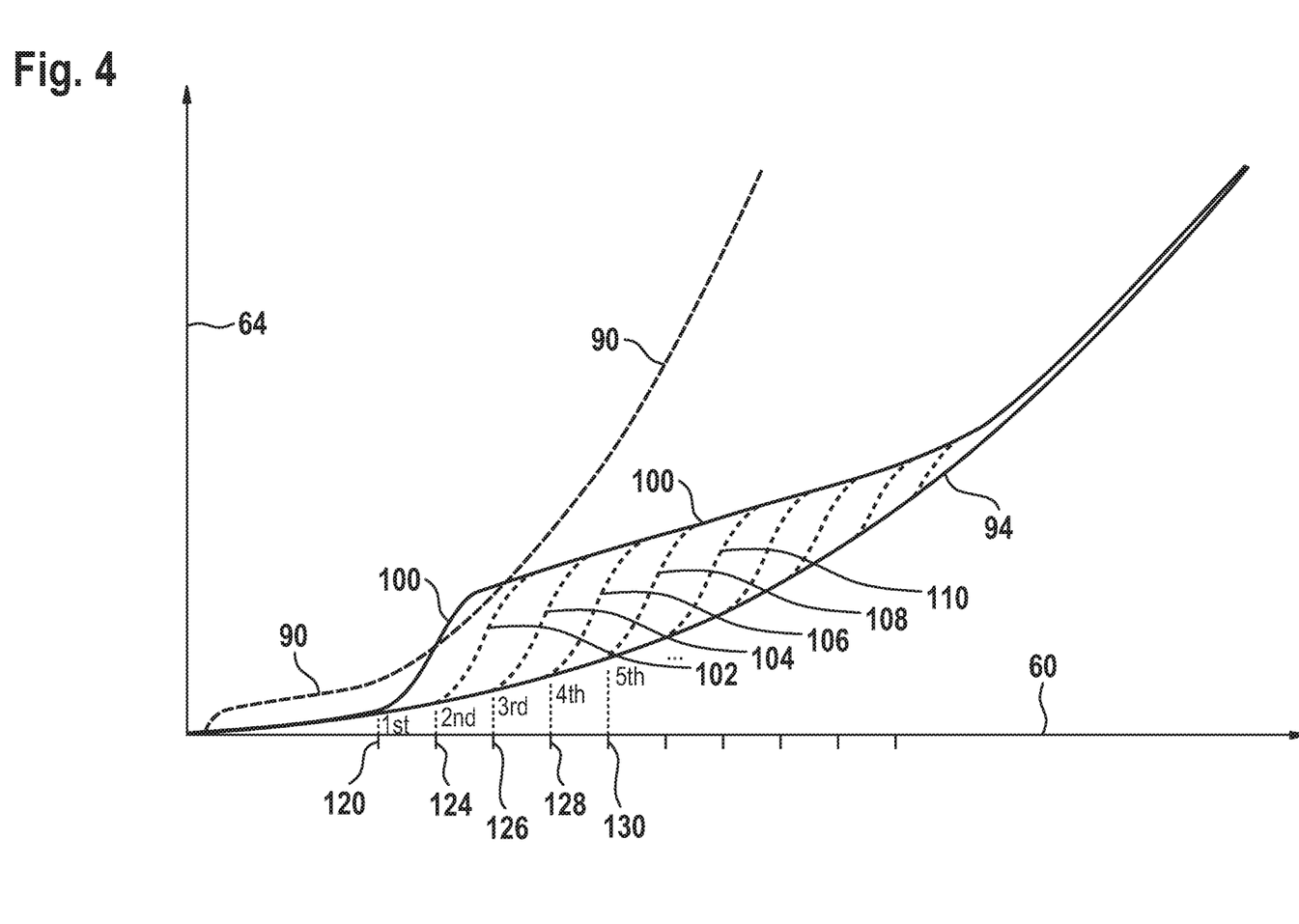
FIG. 4 shows a diagram, given by way of example, of the braking torque as a function of the brake pedal travel covered in various braking scenarios in the case of a sequence of brake pedal actuations.

In FIG. 3, the brake pedal travel is plotted in millimeters on the x axis 60; the vehicle deceleration is once again plotted in m/s$^2$ on the y axis 64. Curve 80 shows the deceleration behaviour in the normal ("by-wire") operating mode, while curve 84 illustrates the deceleration behaviour in the fallback mode. Depending on the brake pedal travel, deceleration starts later in the fallback mode, i.e. with a longer brake pedal travel, thereby possibly disconcerting the driver. Curve 88 shows the vehicle deceleration with an additionally activated parking brake. In comparison with the normal fallback mode, vehicle deceleration starts even with relatively short brake pedal travels and initially rises more steeply, enabling the driver to recognize that the vehicle may still be braked—even if the pedal feel has changed.

If the parking brake is activated uniformly with each pedal actuation in the hydraulic fallback mode, this may lead to damage or functional impairment of the parking brake. According to the example, therefore, the activation point thereof is varied in the event of a sequence of brake pedal actuations, as illustrated in FIG. 4. Here, the x axis 60 once again shows the brake pedal travel, and the y axis 64 shows the vehicle deceleration.

Curve 90 shows the vehicle deceleration in the normal operating mode of the brake system, in which the braking demand of the driver is detected and a setpoint braking torque is determined therefrom. The pressure generating device 5 is activated accordingly by the open- and closed-loop control unit 12 in order to build up in the wheel brakes 8, 9, 10, 11 the brake pressure required for the braking torque.

Curve 94 shows the vehicle deceleration in the hydraulic fallback mode (without activation of the additional brake actuator). Curve 94 rises significantly less steeply than curve 90, which means that the driver has to depress the pedal significantly further to achieve the same deceleration as in the normal operating mode.

Curves 100, 102, 104, 106, 108, 110 each show the vehicle decelerations in the event of a sequence of brake pedal actuations by the driver. During the first actuation of the brake pedal in this sequence, this being symbolized by curve 100, the parking brake is activated or selected when a first pedal travel threshold value 120 is reached. During a second pedal actuation, which may have been preceded by a prior release of the brake pedal, the parking brake is activated or selected at a second, higher pedal travel threshold value 124.

The assistance by the additional brake actuator is preferably activated by an applicable travel threshold value "driver braking" of the brake pedal (variable pedal travel threshold value). If this is undershot, assistance is withdrawn.

In addition to activation via the pedal travel threshold value, a switch-off is preferably superimposed, switching the activation of the additional brake actuator on or off depending on the vehicle deceleration. Additionally, assistance may be reduced when an upper limit value of the vehicle deceleration is exceeded, and assistance is reapplied when a lower limit value is undershot, as long as the travel threshold value is above "driver braking".

The additional brake actuator or parking brake is preferably activated when the brake pedal travel is greater than the (current) pedal travel threshold value and the vehicle deceleration is less than the maximum value (e.g. lower limit value).

Subsequent pedal actuations lead to activation of the parking brake at respectively higher pedal travel threshold values 124, 126, 128, 130 etc. The driver therefore has to depress the brake pedal further and further before the additional braking torque is built up by the parking brake. In this way, the driver finds out or learns that the increasing braking effect was only being used as initial assistance and that they must adjust to the fact that this assistance will disappear in the event of further braking operations. The driver is also led to ever longer brake pedal travels by the ever later onset of the reinforcement and, in this way, they become accustomed to the now longer brake pedal travels. Thus, they are as it were conditioned to the new braking situation.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. An electrohydraulic brake system for a motor vehicle comprising:
   a brake master cylinder which are actuated by a brake pedal, for actuating wheel brakes;
   a pressure generating device, which is activated electronically;
   an additional brake actuator, which is activated electronically,
   an open- and closed-loop control unit, wherein in a normal mode of operation, the open- and closed-loop control unit detects a braking demand on the basis of the actuation of the brake pedal by the driver and activates the pressure generating device to build up braking torque at the wheel brakes;
   wherein in a fallback mode, when the pressure generating device is not activated the driver gains access to the wheel brakes and the open- and closed-loop control unit activates the additional brake actuator to build up braking torque;
   wherein in the fallback mode the open- and closed-loop control unit monitors the brake pedal travel and activates the additional brake actuator to build up braking torque when a predetermined pedal travel threshold value is reached; and
   wherein in the event of a succession of brake pedal actuations by the driver the pedal travel threshold value is increased at least once.

2. The brake system as claimed in claim 1, wherein in the event of a succession of brake pedal actuations the pedal travel threshold value is shifted toward longer brake pedal travel.

3. The brake system as claimed in claim 2, wherein the succession of increased brake pedal actuations have equal pedal travel intervals.

4. The brake system as claimed in claim 1, wherein the additional brake actuator is no longer activated after a predetermined maximum number of successive activations.

5. The brake system as claimed in claim 4, wherein the maximum number is between 30 and 50.

6. The brake system as claimed in claim 1, wherein the intensity of the braking torque generated by the additional actuator is substantially equal, where the braking torque built up by the additional brake actuator is substantially equal in each activation.

7. The brake system as claimed in claim 1, wherein the additional brake actuator is a parking brake.

8. The brake system as claimed in claim 7, wherein the parking brake is electromechanical.

9. The brake system as claimed in claim 7, wherein the parking brake is arranged on the rear axle of the motor vehicle.

10. A method for operating an electrohydraulic brake system for a motor vehicle comprising:
    actuating a brake master cylinder with a brake, wherein the master cylinder actuates wheel brakes;
    activating a pressure generating device electronically;
    activating an additional brake actuator electronically;
    detecting a braking demand in a normal mode of operation on the basis of the actuation of the brake pedal by the driver;
    activating the pressure generating device to build up braking torque at the wheel brakes;
    entering a hydraulic fallback mode when the pressure generating device is not activated, wherein the driver gains direct access to the wheel brakes;
    actuating an additional brake actuator to build up braking torque;
    monitoring the brake pedal travel in the fallback mode,
    activating the additional brake actuator is activated to build up braking torque when a predetermined pedal travel threshold value is reached; and
    increasing the pedal travel threshold value at least once, in the event of a succession of brake pedal actuations by the driver.

11. An electrohydraulic brake system for a motor vehicle comprising:
    a brake master cylinder which are actuated by a brake pedal, for actuating wheel brakes;
    a pressure generating device, which is activated electronically;
    an additional brake actuator, which is activated electronically,
    an open- and closed-loop control unit, wherein in a normal mode of operation, the open- and closed-loop control unit detects a braking demand on the basis of the actuation of the brake pedal by the driver and activates the pressure generating device to build up braking torque at the wheel brakes;
    wherein when the pressure generating device is not activated the driver gains access to the wheel brakes and the open- and closed-loop control unit activates the additional brake actuator to build up braking torque;
    wherein in a fallback mode the open- and closed-loop control unit monitors the brake pedal travel and activates the additional brake actuator to build up braking torque when a predetermined pedal travel threshold value is reached;

wherein in the event of a succession of brake pedal actuations by the driver the pedal travel threshold value is increased at least once; and wherein the additional brake actuator is no longer activated after a predetermined maximum number of successive activations.

* * * * *